United States Patent Office 3,730,950
Patented May 1, 1973

3,730,950
POLYURETHANE COPOLYMERS DERIVED FROM THE CARBORANE-SILICON PHTHALOCYANINE MONOMER
Robert L. Barnes, Clifton, N.J., William M. Block, Staten Island, N.Y., and Daniel Grafstein, Morristown, N.J., assignors to The Singer Company, New York, N.Y.
No Drawing. Application Dec. 15, 1969, Ser. No. 885,335, which is a continuation-in-part of abandoned application Ser. No. 619,199, Feb. 28, 1967. Divided and this application Feb. 1, 1972, Ser. No. 222,706
Int. Cl. C08g 22/00, 22/08
U.S. Cl. 260—77.5 AQ
1 Claim

ABSTRACT OF THE DISCLOSURE

Polyurethane copolymers derived from the carborane-silicon phthalocyanine monomer which are useful as high temperature stable coating, adhesives, molding compounds for electronic components and laminating resins are described.

RELATED APPLICATIONS

This application is a division of application Ser. No. 885,335, filed Dec. 15, 1969, now U.S. Pat. No. 3,671,-489, which was a continuation-in-part of application Ser. No. 619,199, filed Feb. 28, 1967, now abandoned.

The invention herein described was made in the course of or under a contract or subcontract thereunder, with the Department of the Navy.

BACKGROUND OF THE INVENTION

Polymers which are used for coatings, adhesives, laminating resins and molding compounds for electronic applications often breakdown at high temperatures. This breakdown is due to a chemical degradation of the polymer structure. In accordance with the present invention, a new thermally stable prepolymer is disclosed, which, when incorporated into the backbone of conventional polymer structures, gives materials with improved thermal and oxidative stability. The primary constituents of this thermally stable structure are silicon phthalocyanine and carborane.

DESCRIPTION OF THE PRIOR ART

Silicon phthalocyanines, previously described by Kenney et al. in their U.S. Pat. 3,094,536 are characterized by a silicon atom centrally located within a phthalocyanine nucleus. In these compounds, silicon has hexacoordinate character which distinguishes it from the more conventional silicon compounds in which the silicon atom has tetrahedral character. The extraordinary thermal, chemical and oxidative stability of the silicon phthalocyanines is attributed to the hexacoordinate character of silicon in these compounds. Dichlorosilicon phthalocyanine is used as a reactant for the preparation of the prepolymer which is the subject of this invention. This compound can be written as PcSiCl$_2$ where Pc represents the phthalocyanine ring (C$_{32}$H$_{16}$N$_8$). As described by Kenney, the 4 isoindole units of the phthalocyanine ring are linked through the nitrogen atoms to the central metal atom in a square planar ring. The metal participates in bonding to two chlorine atoms perpendicular to and on either side of the planar ring.

Kroenke and co-workers prepared siloxane polymers from dichlorosilicon phthalocyanine (Inorg. Chem. 2, 1964 (1963)). Hydrolysis of dichlorosilicon phthalocyanine to dihydroxysilicon phthalocyanine and subsequent dehydration of the dihydroxy compound gave a siloxane polymer as shown below.

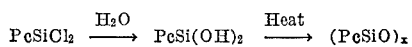

In this polymer, the phthalocyanine rings are stacked in "card-deck" fashion with the SiOSi and OSiO linkages being linear. No decomposition of the polymer was detected when it was subjected to a temperature of 520° C. The polymer was also very resistant to chemical attack. Although this polymer exhibits excellent chemical and thermal stability, its physical properties render it virtually useless for any application. It is a non-melting blue powder which is insoluble in all common organic solvents.

Others have attempted to modify the silicon phthalocyanine structure in order to prepare materials having useful characteristics (ex. solubility in common organic solvents). Kenney and co-workers in the above-mentioned U.S. Pat. 3,094,536 reported the reaction of both dihydroxysilicon phthalocyanine and dichlorosilicon phthalocyanine with benzyl alcohol to give dibenzoxysilicon phthalocyanine. This process showed the reactivity of both the silicon hydroxy group and a silicon chlorine group in a hexacoordinate structure with the hydroxyl group of an alcohol. However, the final product lacked reactive groups for further polymer formation. Luloff and co-workers attempted to prepare a prepolymer condensation product from the reaction of dihydroxysilicon phthalocyanine with resorcinol (Final report NObs 90194, Nov. 15, 1964, General Precision Systems, Inc.). The objective of this work was to prepare a prepolymer having residual reactive groups. The prepolymer could then be further polymerized or reacted with a third comonomer and thereby incorporated into a polymer backbone. The compound they hoped to form was

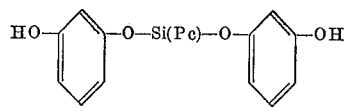

Although they do report infrared spectral evidence for some reaction, no evidence was provided to indicate that the product mixture was characterized or that the objective was realized.

The lack of any prior success in incorporating a silicon phthalocyanine group into a prepolymer with residual functional groups can be attributed to several possible factors. When PcSiCl$_2$ or PcSi(OH)$_2$ are reacted with a difunctional comonomer such as resorcinol, there is a great tendency for long-chain polymer formation to occur. In addition, HCl or by-products, if not removed from the system, could destroy the silicon-oxygen-organic linkage. On the other hand, the extreme insolubility of the phthalocyanine monomer may have been responsible for a low degree of polymerization as well as the complete intractability of the products obtained from all reported attempts to synthesize useful polymeric materials. Therefore, it is not surprising that a useful prepolymer was not isolated.

DESCRIPTION OF THE PREFERRED EMBODIMENTS

Each of the problems enumerated above has been overcome as illustrated by the subject invention. We have found that by judicious choice of coreactant and reaction conditions, a prepolymer containing the silicon phthalocyanine group can be easily formed in high yield. This prepolymer is soluble in common organic solvents and contains reactive groups through which it can be incorporated into a variety of polymer structures forming an integral part of the polymer backbone.

The coreactant for the preparation of this prepolymer contains a carborane nucleus. Carboranes are a rather new series of higher borane derivatives and are described in Kirk-Othmer's "Encyclopedia of Chemical Technology" vol. 3, pages 698, 699. As stated therein: "The B$_{10}$C$_2$H$_{12}$ molecule contains a cage structure very similar to and isoelectronic with the regular icosahedron of the $B_{12}H_{12}^{2-}$ anion. It is characterized by remarkable stability and low reactivity toward oxidizing and reducing reagents." Carboranes exist in three clovo isomer forms (ortho, meta and para) depending on the position of the carbon atoms. In general, the isomers have the same chemical properties and undergo similar chemical reactions. The structures are unusually chemically inert, and standard organic reactions can be performed on organofunctional substituents attached to the carbon atoms:

meta—D. Grafstein and J. Dvorak, Inorg. Chem., 2, 1128 (1963)
para—S. Papetti and T. Heying, J. Am. Chem. Soc., 86, 2295 (1964)
ortho—T. Heying et al., Inorg. Chem. 2, 1809 (1963) and M. Fein et al., Inorg. Chem., 2, 1111 (1963).

In accordance with the present invention, dichlorosilicon phthalocyanine and a carbonate moiety [bis(hydroxymethyl)-ortho-carborane] are reacted to give bis(hydroxymethyl-ortho-carboranylmethyloxy)silicon phthalocyanine (also called the 2:1 prepolymer) according to the following equation.

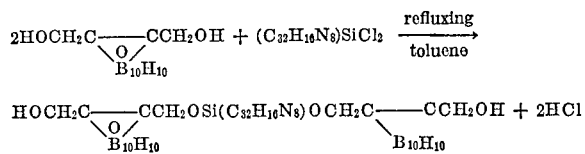

where the unit

is the ortho carborane moiety and $Si(C_{32}H_{16}N_8)$ is the silicon phthalocyanine moiety, and the formula $$(C_{32}H_{16}N_8)SiCl_2$$

refers to a silicon phthalocyanine moiety connected to two chlorine atoms at the central silicon atom.

The reaction is performed in refluxing toluene while maintaining a flow of nitrogen gas through the solution to remove by-product hydrogen chloride. The product is completely soluble in the solvent under the conditions of the reaction and can easily be separated from excess reactants as illustrated below. Conversions of 92 percent are routinely obtained. This reaction is quite novel in view of the failure of others to incorporate a silicon phthalocyanine group into a useful polymer or prepolymer structure.

The synthesis of similar prepolymers from other difunctional carborane structures is apparent. These include the prepolymer from

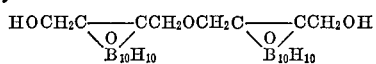

and

where $CB_{10}H_{10}C-$ is the meta carborane nucleus.

The bis(hydroxymethyl - ortho-carboranylmethyloxy) silicon phthalocyanine prepolymer can be incorporated into polysiloxane and polyurethane structures by conventional techniques. Polysiloxanes and polyurethanes are commonly used as adhesives, laminating resins and molding compounds. The preparation of these materials and examples of their applications are given below.

Polysiloxane copolymers can be synthesized from the condensation of bis(hydroxymethyl - ortho-carbonanylmethyloxy)silicon-phthalocyanine with dimethyldichlorosilane, methylphenyldichlorosilane, methyltrichlorosilane and similar alkyl and arylhalosilanes. Polymers of the following general formula were synthesized.

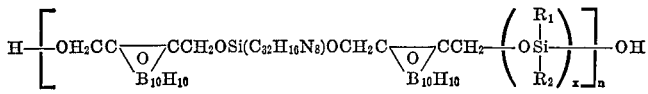

where $R_1$ and $R_2$ can be an alkyl, aryl, or hydroxyl group and $x$ can be as high as 14; $n$ represents the number of repeating units in the chain. Examples of polymers which have been prepared are given in Table 1.

TABLE 1.—PROPERTIES OF SILOXANE POLYMERS CONTAINING 2:1 P

| Repeating unit | Description | Flow point, °C. | Percent 2:1 P |
|---|---|---|---|
| $-[-2:1\ P-O-(Si(CH_3)_2-O-)_x(Si(CH_3)(OH)-O-)_y-]_n$ | Soft gum | 70-80 | 47-60 |
| $-[-2:1\ P-O-(Si(CH_3)_2-O-)_x(Si(CH_3)(CH=CH_2)-O-)_y-]_n$ | Soft, very brittle, glassy solid | 70-80 | 66 |
| $-[-2:1\ P-O-(Si(C_6H_5)_2-O-)_x-]_n$ | ...do... | 40-50 | 55 |
| $-[-2:1\ P-O-(Si(C_6H_5)(CH_3)-O-)_x(Si(CH_3)(OH)-O-)_y-]_n$ | Medium | 70-80 | 50 |

Polyurethane copolymers can be generated by the condensation of bis(hydroxymethylcarboranylmethyloxy) silicon phthalocyanine with organic diisocyanatos such as toluene diisocyanate and methylenebis(p-phenylisocyanate.) Thus, copolymers possessing the following nominal formula were prepared.

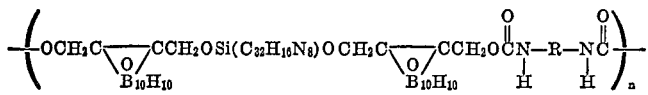

where R can be any alkyl or aryl difunctional group. n again represents the number of repeating units in the chain.

Several such compounds are shown below.

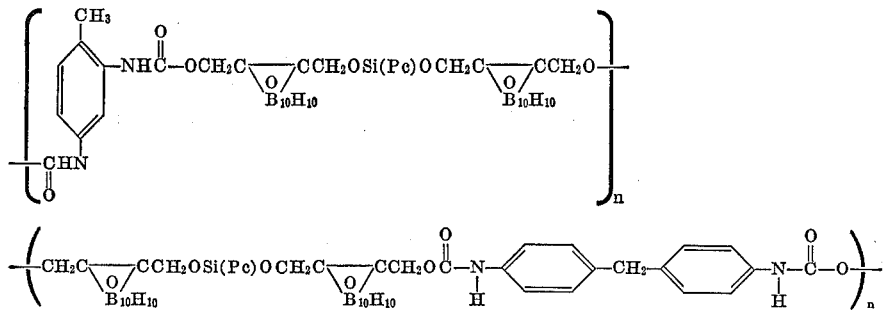

The polymers herein described are useful as high temperature stable coatings and adhesives, molding compounds for electronic components and laminating resins. The special properties of the phthalocyanine structure, particularly its intense blue color, and its high chemical and thermal stability, can be employed to generate permanent, intensely blue coatings and plastics without the addition of colorants.

In order to more fully understand the present invention, the following specific examples are given by way of illustration:

EXAMPLE I

Synthesis of bis(hydroxymethyl-ortho-carboranylmethyloxy)silicon phthalocyanine (2:1 prepolymer)

A five liter three-neck reaction flask was charged with 17.0 g. of dichlorosilicon phthalocyanine, 39.2 g. of 1,2-bis(hydroxymethyl)-ortho-carborane and 4.2 liters of toluene. The flask was equipped with a reflux condenser, mechanical stirrer and thermometer-gas inlet combination. A nitrogen gas flow was maintained through the solution during the reaction period. The mixture was heated to reflux and held at that temperature for five hours. After the flask cooled to 100° C., the mixture was filtered through a Büchner funnel using No. 42 filter paper. Distillation of the bulk of the solvent from the filtrate, followed by Rinco evaporation to dryness, gave a solid consisting of desired product and unreacted 1,2-bis (hydroxymethyl)-ortho-carborane. The solid mixture, air-dried at about 85° C. with a heat lamp, was successively treated with 1000 ml. and 500 ml. portions of methanol. The insoluble 2:1 prepolymer (26.1 g.) was air-dried as above. This amount represents a conversion of 92 percent based on charged dichlorosilicon phthalocyanine. The elemental analysis of the solid is given below:

Calculated (percent): C, 50.70; H, 4.89; N, 11.83; B, 22.84; Cl, 0.

2:1 prepolymer.

Found (percent): C, 50.05; H, 4.98; N, 11.87; B, 22.73; Cl, 0.16.

EXAMPLE II

Synthesis of polysiloxane copolymers from condensation of bis(hydroxymethyl-ortho-carboranylmethyloxy) silicon phthalocyanine with dimethyldichlorosilane, etc.

A solution of 25.0 ml. of dimethyldichlorosilane and 20.0 g. of bis(hydroxymethyl-ortho-carboranylmethyloxy) silicon phthalocyanine in 60 ml. of pyridine (previously distilled from BaO) was prepared under a nitrogen atmosphere. The solution, along with a magnetic stirring bar, was placed in a one-liter round-bottom single-neck flask, and the flask was sealed. The contents of the flask were stirred for one hour at ambient temperature, after which 11.1 ml. of methyltrichlorosilane was added with stirring. Five minutes later, eight ml. of water was added dropwise from a funnel over a period of 15 minutes. The reaction mixture was stirred for an additional 45 minutes.

In order to isolate the polymer, the pyridine solution was divided in half and each half was mixed with 1.5 liters of benzene to precipitate the pyridine hydrochloride. After gravity filtration to remove the precipitate, the filtrates were combined and then split into three equal volume fractions. Each fraction was washed five times with 500 ml. of water. The washed fractions were dried for one-half hour over a fifty g. quantity of $MgSO_4$. The solutions were combined and evaporated to dryness on a Rinco rotary evaporator to yield a resin which could be applied as described in Example III.

EXAMPLE III

Methods for preparing adhesives, coatings and glass-cloth-laminates with the polymer described in Example II A toluene solution of the polymer (described in Example II) consisting of 75% by weight of the polymer and 25% by weight of toluene was prepared. The solution was dip-coated on copper and steel substrates, dried for one hour at room temperature and then cured at 200° C. for two hours. Coatings of 5 mil thickness which had high gloss and adhesion were obtained. These coatings resisted crazing at 300° C. for up to four hours. The addition of 15 parts of pyrogenic alumina to 100 parts of resin was found to reduce brittleness of the cured coatings. Coatings on glass cloth, cured in the manner described above, resisted crazing up to 15 hours at 200° C. Laminates could be prepared in the following manner. Seven plies of glass cloth, dipped in the polymer toluene solution and dried, were stacked in a Carver Press and pressed at 50 p.s.i. and 100° C. to give a laminate structure.

EXAMPLE IV

Synthesis of polyurethane copolymers from condensation of bis(hydroxymethyl-ortho-carboranylmethyloxy) silicon phthalocyanine with isocyanates Five grams (0.0063 mole) of bis(hydroxymethyl-ortho-carboranylmethyloxy) silicon phthalocyanine was added to ten grams of a 50 percent solution of methylene-bis-(p-phenylisocyanate) in chlorobenzene (0.02 mole of reagent). One drop of triethylamine was added, and the reaction mixture was gently warmed for several minutes. The temperature continued to rise to the boiling point of the chlorobenzene with no external aid indicating that reaction had taken place. BHMC, (1,2-bis(hydroxymethyl-o-carborane) (5 gm. 0.025 mole) was then added to the cooled viscous mass. Polymerization took place immediately, and the reaction mixture set up with evolution of heat before all of the BHMC had reacted, as indicated by the presence of white granules in the resin ball. The plastic reaction mass was added to 750 ml. of acetone, stirred for 15 minutes and filtered. Removal of solvent from the washings left a brittle glassy residue which was saved for further investigation. The solid residue in the funnel was washed with another 100 ml. of acetone.

EXAMPLE V

Technique for molding the polymer described in Example IV

The polymer described in Example IV was vacuum dried for three hours at 80° C. to give a hard solid. The dried material was hand ground in a mortar and pestle and pressed into a one-inch disc at 190° C. and 4000 p.s.i. The disc had a smooth shiny surface that was not abraded by scratching with a sharp instrument. It had good impact strength and retained structural integrity up to 250° C.

What is claimed is:

1. A polyurethane having the following recurring unit structure:

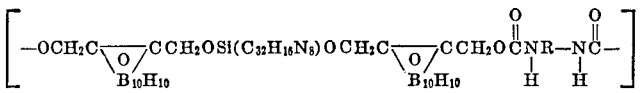

where R is an alkyl or aryl difunctional group.

References Cited

UNITED STATES PATENTS

| | | | |
|---|---|---|---|
| 3,094,536 | 6/1963 | Kenney et al. | 106—288 |
| 3,671,489 | 6/1972 | Barnes et al. | 260—46.5 E |

MAURICE J. WELSH, Jr., Primary Examiner

M. I. MARQUIS, Assistant Examiner

U.S. Cl. X.R.

117—135.1; 161—93, 193; 260—25, 33.6 UB, 371, 46.5 E, 77.5 AP